US012634032B2

(12) United States Patent
Chen et al.

(10) Patent No.: US 12,634,032 B2
(45) Date of Patent: May 19, 2026

(54) DUMMY LIGHT SIGNAL GENERATION APPARATUS AND METHOD, AND RECONFIGURABLE OPTICAL ADD/DROP MULTIPLEXER

(71) Applicant: HUAWEI TECHNOLOGIES CO., LTD., Shenzhen (CN)

(72) Inventors: Fei Chen, Wuhan (CN); Zhuang Zhao, Dongguan (CN); Ming Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/344,962

(22) Filed: Jun. 30, 2023

(65) Prior Publication Data

US 2023/0344541 A1 Oct. 26, 2023

Related U.S. Application Data

(63) Continuation of application No. PCT/CN2022/071271, filed on Jan. 11, 2022.

(30) Foreign Application Priority Data

Jan. 14, 2021 (CN) .......................... 202110049635.0

(51) Int. Cl.
*H04J 14/06* (2006.01)
*H04J 14/02* (2006.01)

(52) U.S. Cl.
CPC .......... *H04J 14/06* (2013.01); *H04J 14/0212* (2013.01)

(58) Field of Classification Search
CPC ...................................................... H04J 14/06
See application file for complete search history.

(56) References Cited

U.S. PATENT DOCUMENTS

| | | | | | |
|---|---|---|---|---|---|
| 6,236,480 | B1 * | 5/2001 | Atlas | .................. | H04B 10/2537 |
| | | | | | 398/9 |
| 6,459,515 | B1 * | 10/2002 | Bergano | .............. | H04J 14/0305 |
| | | | | | 398/79 |
| 6,904,240 | B1 * | 6/2005 | Suga | ........................ | H04J 14/02 |
| | | | | | 398/79 |
| 6,975,790 | B1 * | 12/2005 | Jander | .................. | H04B 10/532 |
| | | | | | 398/115 |
| 7,292,786 | B1 * | 11/2007 | Barbarossa | ........ | G02B 6/29395 |
| | | | | | 398/83 |

(Continued)

FOREIGN PATENT DOCUMENTS

CN 106685532 A 5/2017

*Primary Examiner* — Nathan M Cors
(74) *Attorney, Agent, or Firm* — Maier & Maier, PLLC

(57) ABSTRACT

A dummy light signal generation apparatus, which can be used in the communication field. The apparatus includes: a light source module configured to generate a first wavelength signal and a second wavelength signal, where the first wavelength signal has N first channels, and the second wavelength signal has M second channels; and a polarization beam combiner configured to polarize and combine the first wavelength signal and the second wavelength signal to output a dummy light signal, where the dummy light signal has N+M channels. A polarization state of a wavelength signal of a dummy light signal on any first channel is orthogonal to a polarization state of a wavelength signal of the dummy light signal on the second channel.

20 Claims, 9 Drawing Sheets

(56)             References Cited

U.S. PATENT DOCUMENTS

| 2002/0114562 | A1* | 8/2002 | Bigo ................... | H04J 14/0224 |
| | | | | 385/24 |
| 2003/0137927 | A1* | 7/2003 | Sato ................... | H04B 10/2525 |
| | | | | 370/534 |
| 2008/0310858 | A1 | 12/2008 | Lu et al. | |
| 2018/0241498 | A1* | 8/2018 | Lyubomirsky ......... | H04J 14/06 |

* cited by examiner 303 304 305 306

Wavelength ch40 ch41

403 404

Wavelength ch40 ch41

DUMMY LIGHT SIGNAL GENERATION APPARATUS AND METHOD, AND RECONFIGURABLE OPTICAL ADD/DROP MULTIPLEXER

CROSS-REFERENCE TO RELATED APPLICATIONS

This application is a continuation of International Application No. PCT/CN2022/071271, filed on Jan. 11, 2022, which claims priority to Chinese Patent Application No. 202110049635.0, filed on Jan. 14, 2021. The disclosures of the aforementioned applications are hereby incorporated by reference in their entireties.

TECHNICAL FIELD

The embodiments relate to the communication field, to a dummy light signal generation apparatus and method, and a reconfigurable optical add/drop multiplexer.

BACKGROUND

A submarine cable communication system has high requirements on transmission stability. The system always operates based on a designed quantity of channels to ensure long-term stable working of an optical component such as an optical amplifier repeater in the system.

However, at an initial stage of system setup, a running service light signal may not be capable of meeting a capacity of the designed quantity of channels for the system. Therefore, a dummy light (or supplementary light) signal needs to be configured to fill a channel having no service light signal. Specifically, to reduce a nonlinear penalty of the dummy light signal on the service light signal, a wavelength signal of the dummy light signal on one channel is a combination of two wavelength signals whose polarization states are orthogonal. When no service light signal is filled on a channel, the combination of the wavelength signals is filled on the channel.

Two wavelength signals of a same channel are needed to form one wavelength signal combination (that is, a dummy light signal of one channel). This causes high costs.

SUMMARY

The embodiments provide a dummy light signal generation apparatus and method, and a reconfigurable optical add/drop multiplexer, to enable polarization states of wavelength signals of a dummy light signal on a first channel and a second channel to be orthogonal, so that a dummy light signal of one channel is formed by using a wavelength signal of one channel, to reduce costs.

A first aspect provides a dummy light signal generation apparatus. The apparatus includes a light source module, configured to generate a first wavelength signal and a second wavelength signal. The first wavelength signal has N first channels, the second wavelength signal has M second channels, and N and M each are an integer greater than 0. A channel is frequency distribution of signal transmission in a wavelength division multiplexing system divided by the International Telecommunication Union (ITU). A frequency distribution range of the first wavelength signal may be equal to a frequency distribution range of the N first channels. A polarization beam combiner is configured to polarize and combine the first wavelength signal and the second wavelength signal, to output a dummy light signal. The dummy light signal has N+M channels, and the N+M channels include the N first channels and the M second channels. In other words, a frequency distribution range of the dummy light signal includes the frequency distribution range of the first wavelength signal and a frequency distribution range of the second wavelength signal. Among the N+M channels of the dummy light signal, a polarization state of a wavelength signal on any first channel is orthogonal to a polarization state of a wavelength signal on any second channel.

In the embodiments, when the polarization state of the wavelength signal of the dummy light signal on any first channel is orthogonal to the polarization state of the wavelength signal of the dummy light signal on any second channel, a nonlinear penalty of the dummy light signal on a service light signal can be reduced. In addition, a dummy light signal of one channel is formed by using a wavelength signal of one channel, to reduce costs.

In an optional manner of the first aspect, the first channel is an odd-numbered channel, and the second channel is an even-numbered channel. When the N+M channels are arranged based on a sequence of wavelength magnitude, the first channel and the second channel are arranged alternately. In actual application, a wavelength signal on a low-frequency channel usually has better performance, for example, a higher signal-to-noise ratio, and therefore can provide better quality of service. Therefore, the service light signal usually starts to replace the dummy light signal from a low-frequency channel in the N+M channels. For example, N+M is 120, and when a quantity of channels of the service light signal is 60, the service light signal first replaces 60 channels of a lower frequency in the 120 channels. Therefore, among channels of remaining dummy light signals after the service light signal replaces the dummy light signal, a quantity of the first channels is close to a quantity of the second channels. In this case, nonlinear penalties of the remaining dummy light signals on the service light signal can be reduced as much as possible. Therefore, that the first channel is an odd-numbered channel and the second channel is an even-numbered channel is defined, the nonlinear penalty can be reduced as much as possible on the basis of providing better quality of service.

In an optional manner of the first aspect, the light source module includes a first light source, a second light source, a first optical multiplexer, and a second optical multiplexer. The first light source is configured to generate a plurality of first light beams, and the first optical multiplexer is configured to multiplex the plurality of first light beams into the first wavelength signal. The second light source is configured to generate a plurality of second light beams, and the second optical multiplexer is configured to multiplex the plurality of second light beams into the second wavelength signal. A quantity of polarization beam combiners can be reduced by including the optical multiplexers, to reduce costs.

In an optional manner of the first aspect, the apparatus further includes a polarization controller. The polarization controller is configured to adjust polarization states of the plurality of first light beams or the plurality of second light beams generated by the light source module, to enable the polarization states of the plurality of first light beams to be orthogonal to the polarization states of the plurality of second light beams. A polarization state of a laser beam generated by the light source module is linear polarization. When linear polarization directions of laser beams generated by the first light source and the second light source are the same, polarization states of the laser beams generated by the first light source and the second light source can be orthogonal by including the polarization controller. Therefore, the apparatus may use the first light source and the second light source that are the same, to reduce subsequent operation and maintenance costs of the light source.

In an optional manner of the first aspect, the polarization controller is configured to adjust a polarization state of the first wavelength signal or the second wavelength signal, to enable the polarization state of the first wavelength signal to be orthogonal to the polarization state of the second wavelength signal. The polarization controller is disposed after the optical multiplexer, so that a quantity of polarization controllers can be reduced, to reduce costs.

In an optional manner of the first aspect, a wavelength range included in the N+M channels is the same as a wavelength range of a C-band.

In an optional manner of the first aspect, N is equal to M. In actual application, there may be no case in which the service light signal replaces the dummy light signal. When N is equal to M, the dummy light signal itself has polarization states orthogonal, to reduce a nonlinear penalty of the dummy light signal itself.

In an optional manner of the first aspect, the apparatus further includes a wavelength selective switch, configured to: receive the dummy light signal and the service light signal, and output a target light signal based on the dummy light signal and the service light signal. The target light signal has the N+M channels, and the dummy light signal in the target light signal is used to fill a channel that is in the N+M channels and that transmits no service light signal. That the dummy light signal is filled on the channel that transmits no service light signal may alternatively be understood as that the service light signal replaces a dummy light signal on some channels.

In an optional manner of the first aspect, the target light signal includes a first service light signal, the first service light signal is used to replace a dummy light signal that has a same channel as the first service light signal, and light power of the first service light signal is equal to light power of the dummy light signal having the same channel.

In an optional manner of the first aspect, in a channel of the service light signal, a difference between a quantity of the first channels and a quantity of the second channels is equal to 0 or 1. When N is equal to M, the difference between the quantity of the first channels and the quantity of the second channels is equal to 1 or 0 among channels of remaining dummy light signals after the service light signal replaces the dummy light signal. Therefore, nonlinear penalties of the remaining dummy light signals on the service light signal can be reduced as much as possible.

A second aspect provides a dummy light signal generation method. The method includes: generating a first wavelength signal and a second wavelength signal by using a light source module, where the first wavelength signal has N first channels, the second wavelength signal has M second channels, and N and M each are an integer greater than 0; and polarizing and combining the first wavelength signal and the second wavelength signal by using a polarization beam combiner to output a dummy light signal. The dummy light signal has N+M channels, and the N+M channels include the N first channels and the M second channels. Among the N+M channels of the dummy light signal, a polarization state of a wavelength signal on any first channel is orthogonal to a polarization state of a wavelength signal on any second channel.

In an optional manner of the second aspect, the first channel is an odd-numbered channel, and the second channel is an even-numbered channel.

In an optional manner of the second aspect, the light source module includes a first light source, a second light source, a first optical multiplexer, and a second optical multiplexer.

The method further includes: generating N first light beams by using the first light source; multiplexing the N first light beams into the first wavelength signal by using the first optical multiplexer; generating M second light beams by using the second light source; and multiplexing the M second light beams into the second wavelength signal by using the second optical multiplexer.

In an optional manner of the second aspect, the method further includes: adjusting, by using a polarization controller, polarization states of the N first light beams or the M second light beams generated by the light source module, to enable the polarization states of the N first light beams to be orthogonal to the polarization states of the M second light beams.

In an optional manner of the second aspect, a polarization state of the first wavelength signal or the second wavelength signal is adjusted by using the polarization controller, to enable the polarization state of the first wavelength signal to be orthogonal to the polarization state of the second wavelength signal.

In an optional manner of the second aspect, a wavelength range included in the N+M channels is the same as a wavelength range of a C-band.

In an optional manner of the second aspect, N is equal to M.

In an optional manner of the second aspect, the method further includes: outputting a target light signal by using a wavelength selective switch, where the target light signal has the N+M channels, and the dummy light signal is used to fill a channel that transmits no service light signal and that is of the target light signal.

In an optional manner of the second aspect, the target light signal includes a first service light signal, the first service light signal is used to replace a dummy light signal that has a same channel as the first service light signal, and light power of the first service light signal is equal to light power of the dummy light signal having the same channel.

In an optional manner of the second aspect, in a channel of the service light signal, a difference between a quantity of the first channels and a quantity of the second channels is equal to 0 or 1.

A third aspect provides a reconfigurable optical add/drop multiplexer (ROADM). The ROADM includes: a multiplexing module, an add module, and the dummy light signal generation apparatus in any one of the first aspect or the optional manners of the first aspect. The multiplexing module is configured to: obtain a dummy light signal generated by the apparatus; receive the dummy light signal generated by the apparatus; receive a service light signal from the add module; output a target light signal based on the dummy light signal and the service light signal, where the target light signal has N+M channels, and the dummy light signal in the target light signal is used to fill a channel that is in the N+M channels and that transmits no service light signal; and send the target light signal to a demultiplexing module.

In an optional manner of the third aspect, the target light signal includes a first service light signal, the first service light signal is used to replace a dummy light signal that has a same channel as the first service light signal, and light power of the first service light signal is equal to light power of the dummy light signal having the same channel.

In an optional manner of the third aspect, in a channel of the service light signal, a difference between a quantity of first channels and a quantity of second channels is equal to 0 or 1. When N is equal to M, the difference between the quantity of the first channels and the quantity of the second channels is equal to 1 or 0 among channels of remaining dummy light signals after the service light signal replaces the dummy light signal. Therefore, nonlinear penalties of the remaining dummy light signals on the service light signal can be reduced as much as possible.

DETAILED DESCRIPTION OF EMBODIMENTS

The embodiments provide a dummy light signal generation apparatus and method, and a reconfigurable optical add/drop multiplexer. In the embodiments, polarization states of wavelength signals of a dummy light signal on a first channel and a second channel can be orthogonal so that a dummy light signal of one channel is formed by using a wavelength signal of one channel, to reduce costs. It should be understood that features or content marked by dashed lines in the accompanying drawings in embodiments may be understood as optional operations or optional structures in the embodiments. In descriptions of the embodiments, terms such as "first" and "second" are only used for distinction and description, but should not be understood as an indication or implication of relative importance, and should not be understood as an indication or implication of a sequence.

The dummy light signal generation apparatus and method provided in the embodiments are applied to the communication field, and may be applied to the optical fiber communication field (including a terrestrial optical fiber transmission system and a submarine optical fiber transmission system). An application scenario of the apparatus and the method is described below by using the submarine optical fiber transmission system as an example. The submarine optical fiber transmission system has high requirements on transmission stability. The system always operates based on a designed quantity of waves to ensure long-term stable working of a unit such as an optical amplifier in a line. However, at an initial stage of system setup, a running service light signal may not be capable of meeting a capacity designed for the system. Therefore, a dummy light signal needs to be configured to be filled on a remaining channel.

Figure 1:
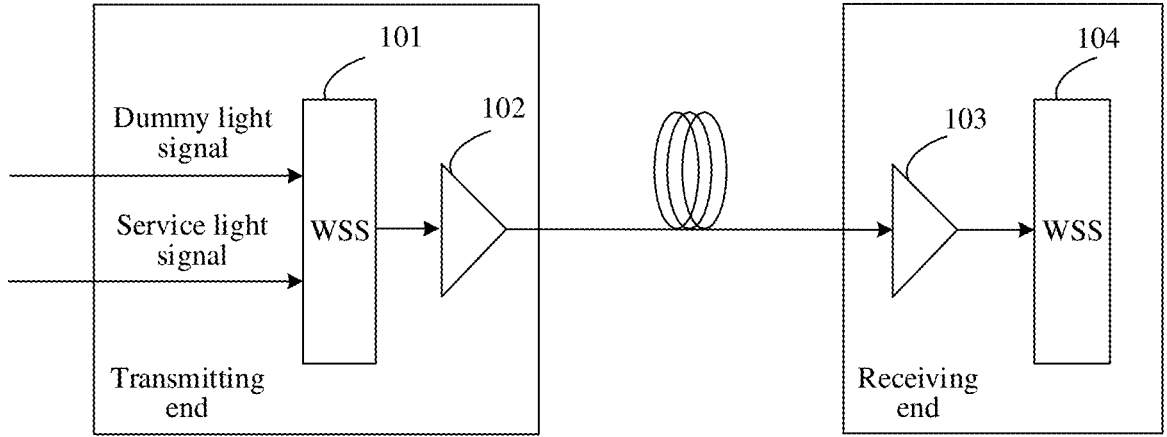
FIG. 1 is a schematic diagram of a structure of a submarine optical fiber transmission system.

FIG. 1 is a schematic diagram of a structure of a submarine optical fiber transmission system. The system includes a transmitting end and a receiving end. The transmitting end and the receiving end are connected through a submarine optical fiber. The transmitting end includes a wavelength selective switch (WSS) 101 and an optical amplifier 102. The WSS 101 is configured to receive a dummy light signal and a service light signal to output a target light signal based on the dummy light signal and the service light signal. For example, the WSS 101 fills the dummy light signal on a channel that transmits no service light signal and keeps that all channels have a wavelength signal. When a wavelength signal of one channel is added to the service light signal, the WSS 101 reduces a wavelength signal of the dummy light signal on a corresponding channel. For example, it is assumed that the WSS 101 has a total of 120 channels, where 40 channels are for the service light signal, and the remaining 80 channels are for the dummy light signal. When a wavelength signal of one channel is added to the service light signal, the WSS 101 reduces a quantity of channels of the dummy light signal. In this case, in the target light signal output by the WSS 101, the service light signal has 41 channels, and the dummy light signal has 79 channels. The optical amplifier 102 receives the target light signal output by the WSS 101, and performs power amplification on the target light signal. Then, the target light signal is transmitted to the receiving end through the submarine optical fiber. An optical amplifier 103 at the receiving end amplifies the target light signal again, and then inputs the target light signal into a WSS 104.

Figure 2:
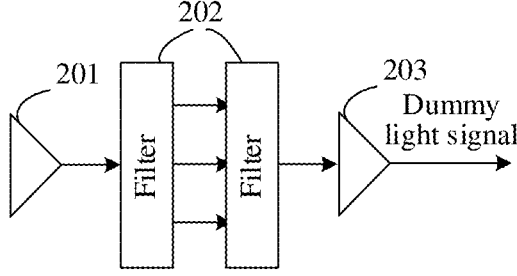
FIG. 2 is a schematic diagram of a structure of a dummy light signal generation apparatus.

Therefore, there is a need for an apparatus that can generate a dummy light signal, to provide a dummy light signal for the WSS 101. FIG. 2 is a schematic diagram of a structure of a dummy light signal generation apparatus. The apparatus includes an optical fiber amplifier 201, a filter 202, and an optical fiber amplifier 203. The optical fiber amplifier 201 and the optical fiber amplifier 203 are erbium-doped fiber amplifiers (EDFAs). The optical fiber amplifier 201 outputs a wide-spectrum amplified spontaneous emission (ASE) light source through spontaneous emission. After passing through the filter 202, the ASE light source becomes a desired seed dummy light signal. The optical fiber amplifier 203 excites an erbium ion of a baseband to a high-energy state by using a pump source, so that a quantity of particles is reversed. Then stimulated radiation is generated, to amplify the seed dummy light signal and output a dummy light signal.

Figure 3A:
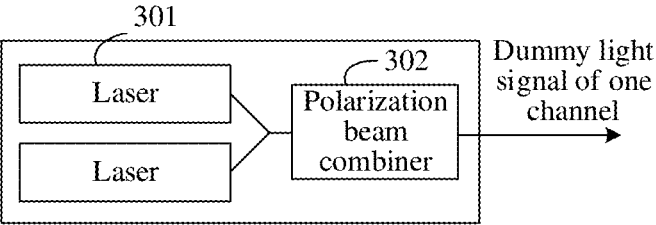
FIG. 3a is another schematic diagram of a structure of a dummy light signal generation apparatus.
Figure 3B:
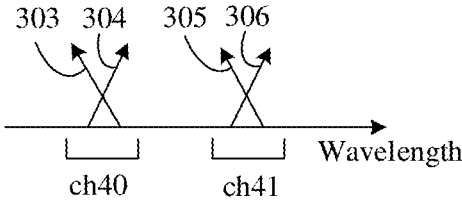
FIG. 3b is a schematic diagram of distribution of dummy light signals of two channels.

However, the apparatus needs a plurality of components, and integration of the optical fiber amplifiers is low, resulting in a large size of the apparatus. Therefore, a semiconductor material—based laser light source may be used to generate a dummy light signal. FIG. 3a is another schematic diagram of a structure of a dummy light signal generation apparatus. As shown in FIG. 3a, the apparatus includes two semiconductor material—based lasers 301. The two lasers 301 generate two wavelength signals in a single polarization state (also referred to as a linear polarization state). A polarization beam combiner 302 polarizes and combines the two wavelength signals, to output a dummy light signal of one channel. FIG. 3b is a schematic diagram of distribution of dummy light signals of two channels. As shown in FIG. 3b, because the two wavelength signals generated by the lasers 301 have a same channel, a dummy light signal formed by the two wavelength signals also has one channel. The dummy light signal of one channel (ch40) is a combination of a wavelength signal 303 and a wavelength signal 304. To reduce a polarization correlation penalty of a dummy light signal on a service light signal, polarization states of the wavelength signal 303 and the wavelength signal 304 are orthogonal. In addition, if a frequency difference between the wavelength signal 303 and the wavelength signal 304 is less than 5 GHz, the dummy light signal causes an extra nonlinear penalty for the service light signal. Therefore, it is required that frequencies of the wavelength signal 303 and the wavelength signal 304 be staggered by 5 GHz to 20 GHz. Similarly, a combination of a wavelength signal 305 and a wavelength signal 306 produces a dummy light signal of another channel (ch41). It can be understood from FIG. 3a and FIG. 3b that forming a dummy light signal of one channel needs two wavelength signals (for example, the wavelength signal 303 and the wavelength signal 304, or the wavelength signal 305 and the wavelength signal 306) of a same channel. In this case, costs of the apparatus are high. The same channel means that a channel of needed wavelength signals is the same as a channel of a formed dummy light signal.

Figure 4A:
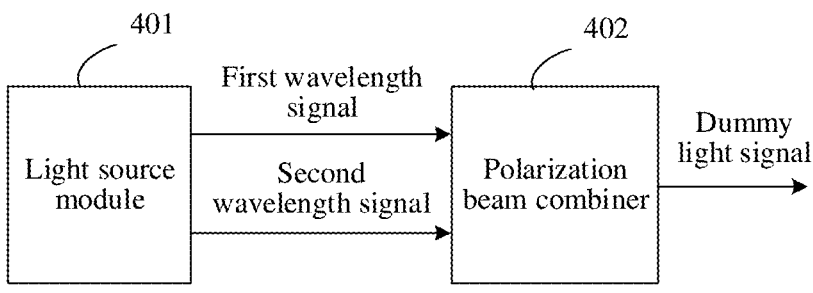
FIG. 4a is a schematic diagram of a structure of a dummy light signal generation apparatus.
Figure 4B:
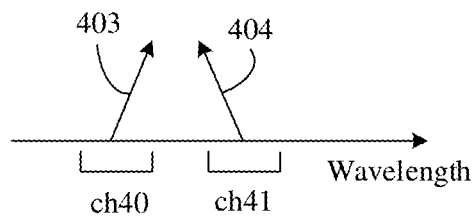
FIG. 4b is a schematic diagram of distribution of dummy light signals of two channels.

Therefore, the embodiments provide a dummy light signal generation apparatus. Polarization states of a wavelength signal on a first channel and a wavelength signal on a second channel are orthogonal, to reduce a polarization correlation penalty of the dummy light signal on the service light signal. Therefore, a dummy light signal of one channel may be formed by using a wavelength signal of one channel, to reduce costs. FIG. 4a is a schematic diagram of a structure of a dummy light signal generation apparatus according to the embodiments. As shown in FIG. 4a, the apparatus includes a light source module 401. The light source module 401 generates a first wavelength signal and a second wavelength signal. The first wavelength signal and the second wavelength signal belong to different light source beams, for example, different laser beams. The first wavelength signal has N first channels, the second wavelength signal has M second channels, and N and M each are an integer greater than 0. The following provides descriptions by using an example in which N and M are equal to 1. It is assumed that the first channel is ch40, and the second channel is ch41. A polarization beam combiner 402 polarizes and combines the first wavelength signal and the second wavelength signal, to output dummy light signals of two channels. The dummy light signal has N+M channels, and the N+M channels include the N first channels and the M second channels. FIG. 4b is a schematic diagram of distribution of dummy light signals of two channels according to the embodiments. As shown in FIG. 4b, the dummy light signals of two channels have ch40 and ch41, and ch40 and ch41 are two adjacent channels. Because the first wavelength signal and the second wavelength signal have two channels, the formed dummy light signals also have two channels. The dummy light signals of the two channels are a combination of a wavelength signal 403 and a wavelength signal 404. Polarization states of the wavelength signal 403 and the wavelength signal 404 are orthogonal, in other words, a polarization state of a wavelength signal of the dummy light signal on any first channel is orthogonal to a polarization state of a wavelength signal of the dummy light signal on any second channel. In this case, the first wavelength signal and the second wavelength signal may be respectively used to form the dummy light signals of the two channels, that is, a wavelength signal of one channel forms a dummy light signal of one channel. For example, a dummy light signal of ch40 is formed by using the first wavelength signal, and a dummy light signal of ch41 is formed by using the second wavelength signal. It should be noted that ch40 and ch41 herein are merely examples. In actual application, the first channel and the second channel may not be adjacent.

The following provides supplementary descriptions of a relationship between the first wavelength signal and the wavelength signal 403. The light source module 401 may generate a circularly polarized laser beam, or may generate a linearly polarized laser beam. If the first wavelength signal is a circularly polarized laser beam, the polarization beam combiner 402 functions as a polarizer, in other words, the wavelength signal 403 is a wavelength signal obtained after the first wavelength signal passes through the polarizer. If the first wavelength signal is a linearly polarized laser beam, the polarization beam combiner 402 functions as a polarization analyzer, in other words, the wavelength signal 403 is a wavelength signal obtained after the first wavelength signal passes through the polarization analyzer. Similarly, for a relationship between the second wavelength signal and the wavelength signal 404, refer to the relationship between the first wavelength signal and the wavelength signal 403.

Figure 5:
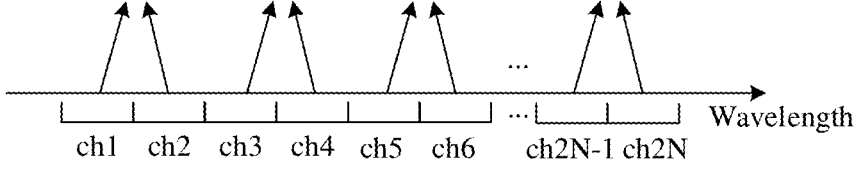
FIG. 5 is a schematic diagram of distribution of dummy light signals on channels according to an embodiment.

The foregoing describes a scenario in which N and M are equal to 1, and the dummy light signal form two channels in the embodiments. In actual application, the dummy light signal may form more channels. The following describes the dummy light signal generation apparatus in the embodiments by using an example in which N is equal to M. FIG. 5 is a schematic diagram of distribution of dummy light signals on channels according to an embodiment. In FIG. 5, ch1, ch2, ch3, . . . , and ch2N are sorted based on wavelength magnitude. A first channel is an odd-numbered channel, including ch1, ch3, ch5, . . . , and ch2N-1. A second channel is an even-numbered channel, including ch2, ch4, ch6, . . . , and ch2N. Polarization states of a wavelength signal on ch1 and a wavelength signal on ch2 are orthogonal, and polarization states of the wavelength signal on ch2 and a wavelength signal on ch3 are orthogonal. To realize the distribution of the dummy light signals shown in FIG. 5, the dummy light signal generation apparatus needs two light sources.

Figure 6:
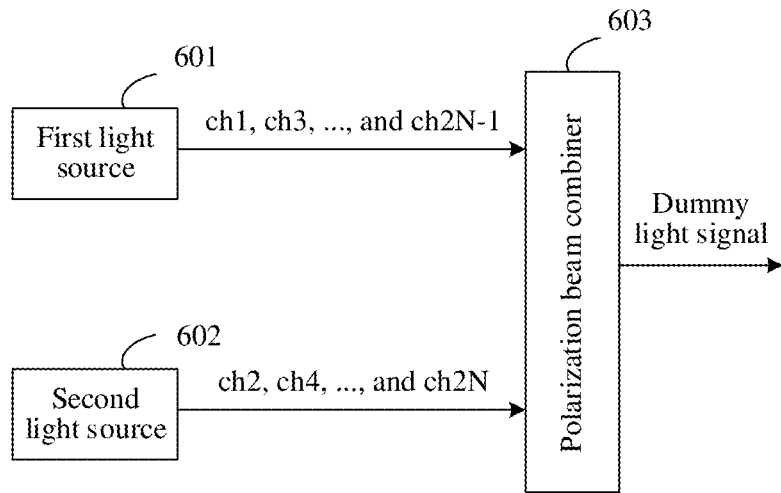
FIG. 6 is another schematic diagram of a structure of a dummy light signal generation apparatus.

FIG. 6 is another schematic diagram of a structure of a dummy light signal generation apparatus according to the embodiments. As shown in FIG. 6, a first light source 601 generates a first wavelength signal, and the first wavelength signal has N first channels. A second light source 602 generates a second wavelength signal, and the second wavelength signal has N second channels. A polarization beam combiner 603 polarizes and combines the first wavelength signal and the second wavelength signal, to output a dummy light signal.

Figure 7:
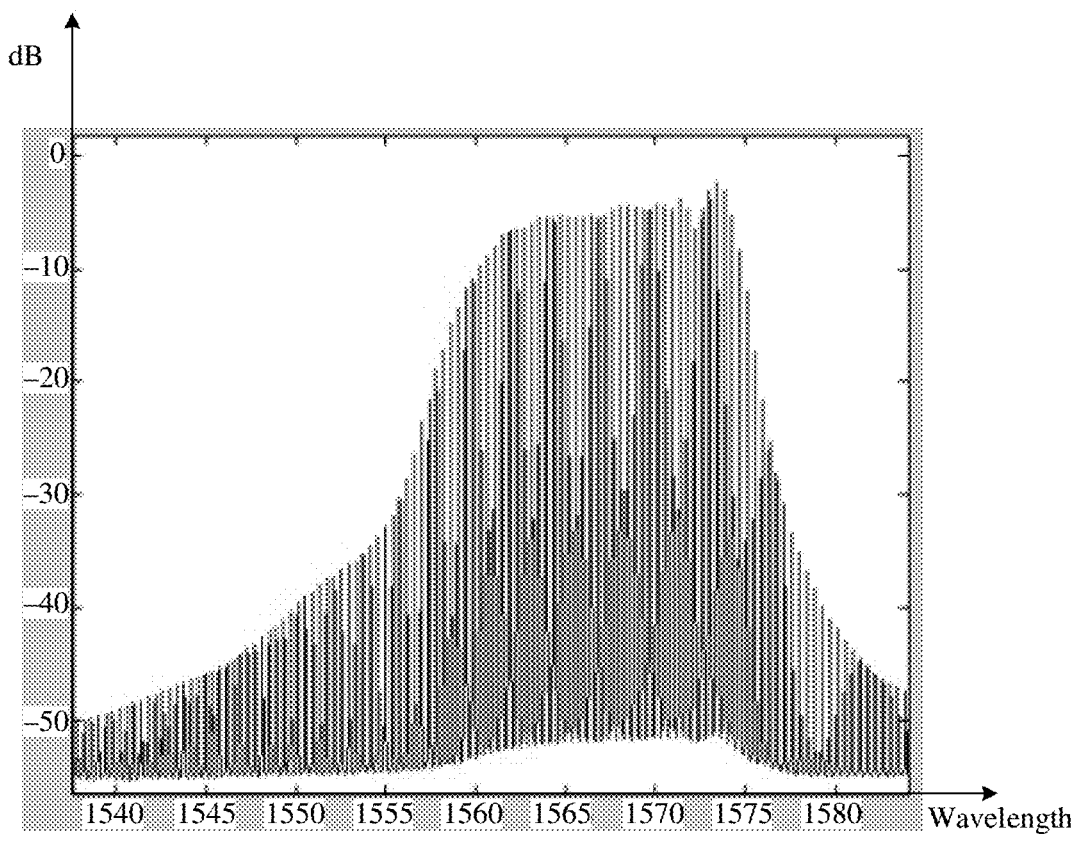
FIG. 7 is a schematic diagram of an output optical spectrum of a mode-locked laser.

The first light source 601 and the second light source 602 may be semiconductor lasers, for example, distributed feedback (DFB) lasers or mode-locked lasers. In actual application, output bandwidth of the laser is limited, or an output wavelength range is limited. For example, FIG. 7 is a schematic diagram of an output spectrum of a mode-locked laser according to the embodiments. An effective output wavelength range of the mode-locked laser in the figure is about 1556.5-1572.5 nm, and an effective wavelength range is about 16 nm. When the dummy light signal is needed to cover a C-band channel, a wavelength range of the dummy light signal is 1524.5-1572.5 nm. The channel is divided into ch1, ch2, ch3, . . . , and ch120 based on a dense wavelength division multiplexing (DWDM) channel spacing of 50 GHz. That is, N and M are equal to 60. Because the first channel and the second channel are alternately arranged, if the mode-locked laser shown in FIG. 7 is used as the first light source 601, an output interval of a wavelength signal of the mode-locked laser is 100 GHz, that is, a wavelength signal of one channel can be output every other channel. A single mode-locked laser effectively outputs wavelength signals of 20 channels. Because N is equal to 60, three mode-locked lasers are needed as the first light source 601.

Figure 8:
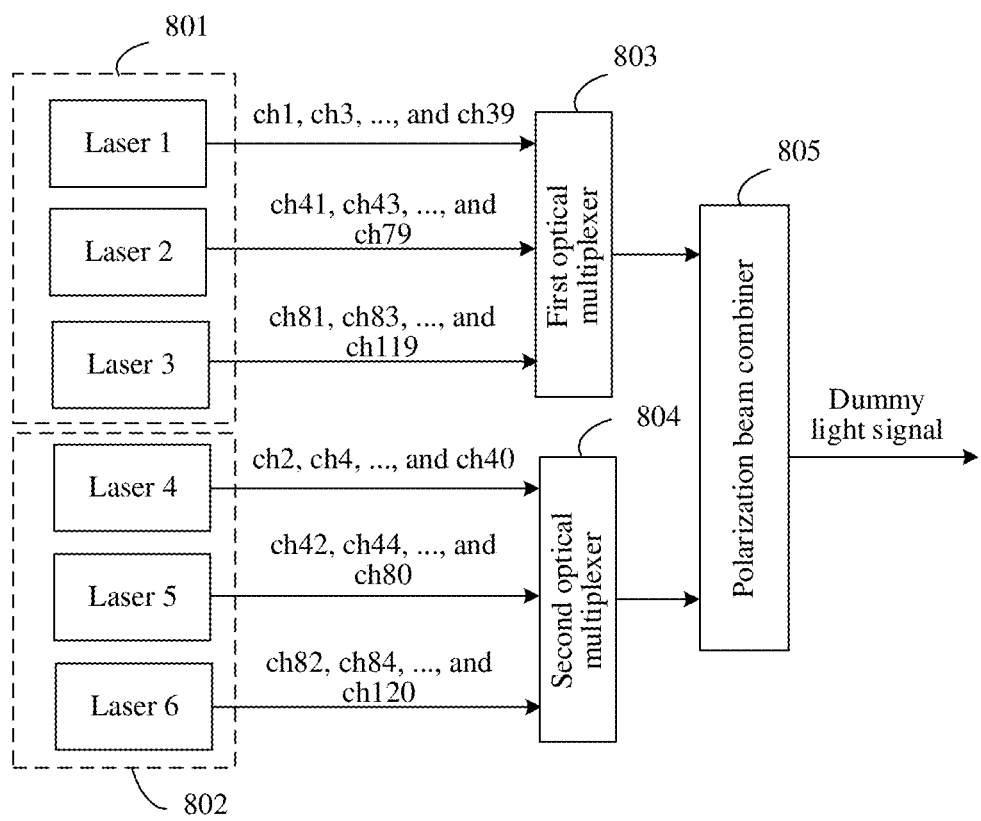
FIG. 8 is another schematic diagram of a structure of a dummy light signal generation apparatus.

FIG. 8 is another schematic diagram of a structure of a dummy light signal generation apparatus according to the embodiments. The apparatus shown in FIG. 8 includes a first light source 801 and a second light source 802. The first light source 801 includes a laser 1, a laser 2, and a laser 3. The laser 1 is configured to generate wavelength signals of 20 channels ch1, ch3, . . . , and ch39. The laser 2 is configured to generate wavelength signals of 20 channels ch41, ch43, . . . , and ch79. The laser 3 is configured to generate wavelength signals of 20 channels ch81, ch83, . . . , and ch119. The second light source 802 includes a laser 4, a laser 5, and a laser 6. The laser 4 is configured to generate wavelength signals of 20 channels ch2, ch4, . . . , and ch40. The laser 5 is configured to generate wavelength signals of 20 channels ch42, ch44, . . . , and ch80. The laser 6 is configured to generate wavelength signals of 20 channels ch82, ch84, . . . , and ch120.

As shown in FIG. 8, the apparatus further includes a first optical multiplexer 803 and a second optical multiplexer 804. The first optical multiplexer 803 is configured to receive three light beams output by the first light source 801, and multiplex the three light beams into one light beam to obtain a first wavelength signal. The second optical multiplexer 804 is configured to receive three light beams output by the second light source 802, and multiplex the three light beams into one light beam to obtain a second wavelength signal. The first wavelength signal has a total of 60 channels ch1, ch3, . . . , and ch119, and the second wavelength signal has a total of 60 lanes ch2, ch4, . . . , and ch120. A polarization beam combiner 805 receives the first wavelength signal and the second wavelength signal, and polarizes and combines the first wavelength signal and the second wavelength signal to output a dummy light signal. The dummy light signal has 120 channels from ch1 to ch120 with continuous frequency spectrum distribution. Polarization states of the first wavelength signal and the second wavelength signal may be orthogonal, or may not be orthogonal. When the polarization states of the first wavelength signal and the second wavelength signal are orthogonal, the first wavelength signal and the second wavelength signal are linearly polarized laser beams. In this case, the polarization beam combiner 805 functions as a polarization analyzer, and the polarization beam combiner 805 does not change the polarization states of the first wavelength signal and the second wavelength signal. Therefore, polarization states of a wavelength signal (a wavelength signal on an odd-numbered channel) included in the dummy light signal on the first channel and a wavelength signal (a wavelength signal on an even-numbered channel) included in the dummy light signal on the second channel are orthogonal. When the polarization states of the first wavelength signal and the second wavelength signal are not orthogonal, the first wavelength signal and the second wavelength signal may be circularly polarized laser beams. In this case, the polarization beam combiner 805 functions as a polarizer. The polarization beam combiner 805 converts a circularly polarized first wavelength signal into a linearly polarized first wavelength signal, and converts a circularly polarized second wavelength signal into a linearly polarized second wavelength signal. Therefore, polarization states of a wavelength signal (the linearly polarized first wavelength signal) of the dummy light signal on the first channel and a wavelength signal (the linearly polarized second wavelength signal) of the dummy light signal on the second channel are orthogonal.

Figure 9:
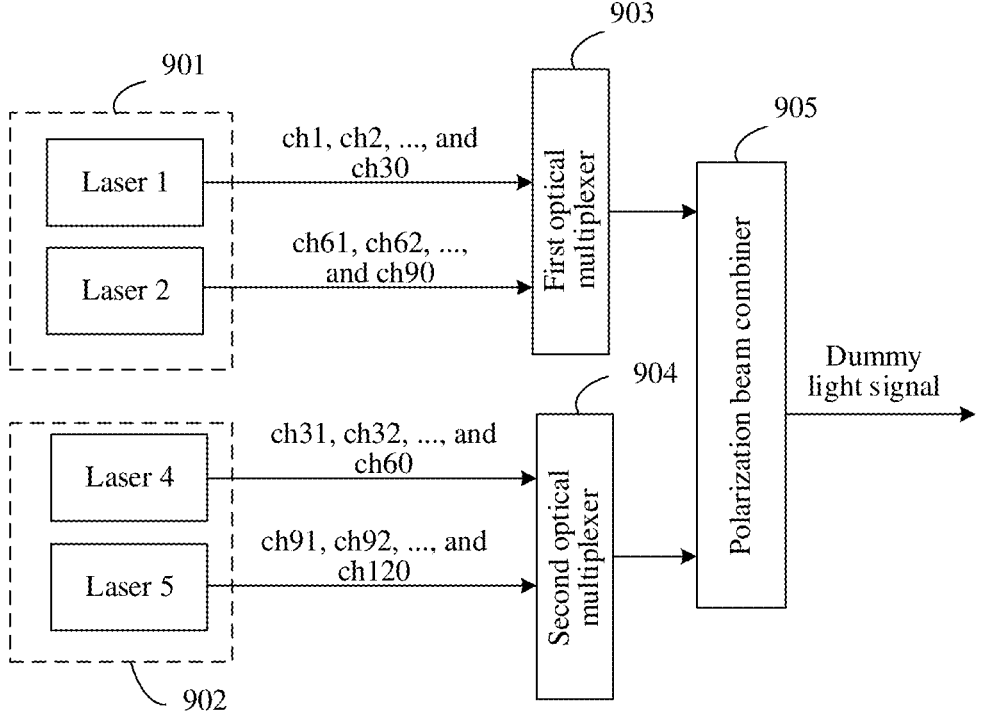
FIG. 9 is another schematic diagram of a structure of a dummy light signal generation apparatus.

It should be noted that alternately arranging the first channel and the second channel is an optional manner of the embodiments. In actual application, there may alternatively be another implementation solution. For example, FIG. 9 is another schematic diagram of a structure of a dummy light signal generation apparatus according to the embodiments. The assumption in FIG. 8 is unchanged, for example, N and M are equal to 60. The apparatus includes a first light source 901 and a second light source 902. The first light source 901 includes a laser 1 and a laser 2. The laser 1 is configured to generate wavelength signals of 30 channels ch1, ch2, . . . , and ch30. The laser 2 is configured to generate wavelength signals of 30 channels ch61, ch62, . . . , and ch90. The second light source 902 includes a laser 4 and a laser 5. The laser 4 is configured to generate wavelength signals of 30 channels ch31, ch32, . . . , and ch60. The laser 5 is configured to generate wavelength signals of 30 channels ch91, ch92, . . . , and ch120.

The laser 1 is still the mode-locked laser shown in FIG. 7. The output effective wavelength range of the mode-locked laser shown in FIG. 7 is about 16 nm. When an output interval of a wavelength signal of the mode-locked laser is 100 GHz, a single mode-locked laser effectively outputs wavelength signals of 20 channels. When an output interval of a wavelength signal of the mode-locked laser is 50 GHz, a single mode-locked laser effectively outputs wavelength signals of 40 channels. Therefore, an output capability of the laser 1 in FIG. 9 is still surplus, that is, the laser 1 is capable of outputting wavelength signals of 40 channels, but outputs only wavelength signals of 30 channels of the wavelength signals of 40 channels. In FIG. 9, a first channel includes ch1, ch2, . . . , and ch30, and ch61, ch62, . . . , and ch90. A second channel includes ch31, ch32, . . . , and ch60, and ch91, ch92, . . . , and ch120.

As shown in FIG. 9, the apparatus further includes a first optical multiplexer 903, a second optical multiplexer 904, and a polarization beam combiner 905. The first optical multiplexer 903 is configured to: receive two wavelength signals generated by the laser 1 and the laser 2, and multiplex the two wavelength signals to output a first wavelength signal. The second optical multiplexer 904 is configured to: receive two wavelength signals generated by the laser 4 and the laser 5, and multiplex the two wavelength signals to output a second wavelength signal. A polarization beam combiner 905 is configured to: receive the first wavelength signal and the second wavelength signal, and polarize and combine the first wavelength signal and the second wavelength signal to output a dummy light signal.

In comparison with the apparatus in FIG. 8, a quantity of lasers in the apparatus in FIG. 9 is reduced by changing distribution of the first channel and the second channel. In addition, influence of a transition wave band is reduced.

As shown in FIG. 7, the effective output wavelength range of the mode-locked laser is 1556.5-1572.5 nm. However, the mode-locked laser still outputs a wavelength signal in a partial wavelength range (also referred to as a transition wave band) below 1556.5 nm and in a partial wavelength range above 1572.5 nm. However, the dummy light signal does not need the wavelength signal in the partial wavelength range, or power of the wavelength signal in the partial wavelength range does not meet a power requirement. FIG. 8 is used as an example. An output wavelength range of the laser 1 is a wavelength range corresponding to ch1, ch3, . . . , and ch39. According to the foregoing descriptions of the transition wave band, it can be understood that on some channels above ch39, for example, ch41, the laser 1 also outputs a wavelength signal on ch41. For ease of description, a wavelength signal output by the laser 1 on ch41 is referred to as a wavelength signal 1, and a wavelength signal output by the laser 2 on ch41 channel is referred to as a wavelength signal 2. When the first optical multiplexer 803 multiplexes three light beams output by the first light source 801, the wavelength signal 1 affects the wavelength signal 2. For example, the wavelength signal 1 reduces power of the wavelength signal 2, and a power loss is generated. Conversely, a wavelength signal generated by the laser 2 on ch39 also affects a wavelength signal of the laser 1 on ch39. However, in FIG. 9, an output wavelength range of the laser 1 is a wavelength range corresponding to ch1, ch2, . . . , and ch30, and an output wavelength range of the laser 2 is a wavelength range corresponding to ch61, ch62, . . . , and ch90. In this case, a quantity of channels between ch61 and ch30 is greater than a quantity of channels between ch41 and ch39. For example, the quantity of channels between ch61 and ch30 is 30, and the quantity of channels between ch41 and ch39 is 1. Therefore, ch61 may not be in a transition wave band of the laser 1, in other words, the influence of the transition wave band is reduced, and the power loss is reduced. Similarly, in FIG. 3b, a quantity of channels between ch40 and ch41 is 0.

It can be understood from the foregoing descriptions of the apparatus shown in FIG. 3a and FIG. 3b that frequencies of two wavelength signals such as the wavelength signal 303 and the wavelength signal 304 on one channel need to be staggered by 5 GHz to 20 GHz. When the channel is in the transition wave band of the laser, in addition to the two wavelength signals on the channel, the channel further includes a wavelength signal generated by the laser. For example, in FIG. 3b, ch40 includes the wavelength signal 303 and the wavelength signal 304. It is assumed that the wavelength signal 303 is generated by the laser 1, the wavelength signal 304 is generated by the laser 2, the wavelength signal 305 is generated by the laser 3, and the wavelength signal 306 is generated by the laser 4. It can be understood from the foregoing descriptions of the transition wave band that ch40 is in a transition wave band of the laser 3 and the laser 4. Therefore, the laser 3 outputs a wavelength signal 3 on ch40, and the laser 4 outputs a wavelength signal 4 on ch40. So far, ch40 includes the wavelength signal 303, the wavelength signal 304, the wavelength signal 3, and the wavelength signal 4. It may be considered that the wavelength signal 3 corresponds to the wavelength signal 303, and the wavelength signal 304 corresponds to the wavelength signal 4. For example, both the wavelength signal 3 and the wavelength signal 305 are generated by the laser 3. Therefore, a linear polarization direction of the wavelength signal 3 is the same as a linear polarization direction of the wavelength signal 305. It can be learned from FIG. 3b that linear polarization directions of the wavelength signal 303 and the wavelength signal 305 are the same. Therefore, linear polarization directions of the wavelength signal 303 and the wavelength signal 3 are the same, that is, the wavelength signal 3 corresponds to the wavelength signal 303. Similarly, it can be understood that linear polarization directions of the wavelength signal 304 and the wavelength signal 4 are the same, that is, the wavelength signal 4 corresponds to the wavelength signal 304. In addition, an output frequency of a semiconductor laser is susceptible to temperature. In this case, in 50 GHz, it is particularly difficult to stagger four wavelength signals pairwise over 5 GHz. However, below 5 GHz, the dummy light signal causes an extra nonlinear penalty for the service light signal. In the embodiments, a dummy light signal of one channel is formed by using a wavelength signal of one channel. Therefore, even if the channel is in a transition wave band, only one wavelength signal is added to the channel. Therefore, in comparison with the apparatus in FIG. 3a, it is relatively easy for the apparatus in the embodiments to stagger, in 50 GHz, two wavelength signals by more than 5 GHz. Therefore, a nonlinear penalty of the dummy light signal on the service light signal can be reduced.

It should be understood that FIG. 8 and FIG. 9 are merely examples. In practical applications, there are more alternatives.

Figure 10:
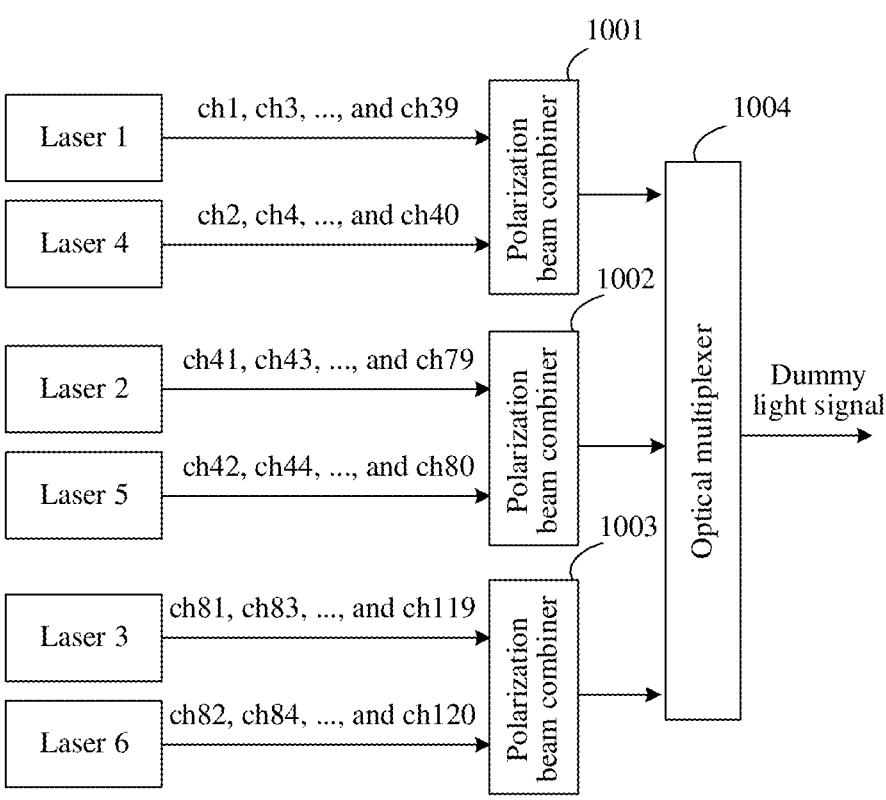
FIG. 10 is another schematic diagram of a structure of a dummy light signal generation apparatus.

For example, a polarization beam combiner is located between a laser and an optical multiplexer. Based on FIG. 8, FIG. 10 is another schematic diagram of a structure of a dummy light signal generation apparatus according to the embodiments. A polarization beam combiner 1001 is configured to: receive two wavelength signals generated by the laser 1 and the laser 4, and polarize and combine the two wavelength signals. Similarly, a polarization beam combiner 1002 is configured to receive two wavelength signals generated by the laser 2 and the laser 5. A polarization beam combiner 1003 is configured to receive two wavelength signals generated by the laser 4 and the laser 6. An optical multiplexer 1004 is configured to receive the wavelength signals output by the polarization beam combiner 1001, the polarization beam combiner 1002, and the polarization beam combiner 1003, to obtain a dummy light signal. In the apparatus in FIG. 8, two optical multiplexers are needed, and in the apparatus in FIG. 10, one optical multiplexer is needed. Therefore, in comparison with the apparatus in FIG. 8, a quantity of optical multiplexers in the apparatus in FIG. 10 can be reduced.

For example, in FIG. 8, the apparatus may not include the laser 2 and the laser 5. In other words, the formed dummy light signal has 80 channels, such as channels ch1 to ch40 and channels ch81 to ch120, with discontinuous frequency spectrum distribution. Therefore, the dummy light signal generation apparatus can generate a dummy light signal having discontinuous channels.

For example, in FIG. 9, the laser 3 is added to the first light source 901, and the laser 6 is added to the second light source 902. The laser 1 is configured to generate wavelength signals of 20 channels ch1, ch2, . . . , and ch20. The laser 2 is configured to generate wavelength signals of 20 channels ch61, ch62, . . . , and ch80. The laser 3 is configured to generate wavelength signals of 20 channels ch101, ch102, . . . , and ch120. The first optical multiplexer is configured to: receive three wavelength signals generated by the laser 1, the laser 2, and the laser 3, and multiplex the three wavelength signals to generate a first wavelength signal. Similarly, the lasers 4 to 6 are respectively configured to generate wavelength signals of the remaining 20 channels. The second optical multiplexer is configured to: receive three wavelength signals generated by the laser 4, the laser 5, and the laser 6, and multiplex the three wavelength signals to generate a second wavelength signal. A larger quantity of output channels of the laser usually indicates a higher cost of the laser. In FIG. 9, the laser needs to output wavelength signals of 30 channels. In this embodiment, the laser needs to output wavelength signals of 20 channels. Therefore, in this embodiment, a quantity of output channels of the laser is reduced. This can reduce a requirement of the dummy light signal generation apparatus for an output capability of the laser.

For example, based on FIG. 9, the laser 1 generates wavelength signals of 15 channels ch1, ch3, . . . , and ch29, and the laser 2 generates wavelength signals of 15 channels ch61, ch63, . . . , and ch89. The first optical multiplexer is configured to: receive two wavelength signals generated by the laser 1 and the laser 2, and multiplex the two wavelength signals to generate a first wavelength signal. The laser 4 generates wavelength signals of 15 channels ch32, ch34, . . . , and ch60, and the laser 5 generates wavelength signals of 15 channels ch92, ch94, . . . , and ch120. The second optical multiplexer is configured to: receive two wavelength signals generated by the laser 4 and the laser 5, and multiplex the two wavelength signals to generate a second wavelength signal. In this case, a quantity of channels between ch61 and ch29 is 30. In comparison with FIG. 8, the influence of the transition wave band can be further reduced.

Figures 11, 12:
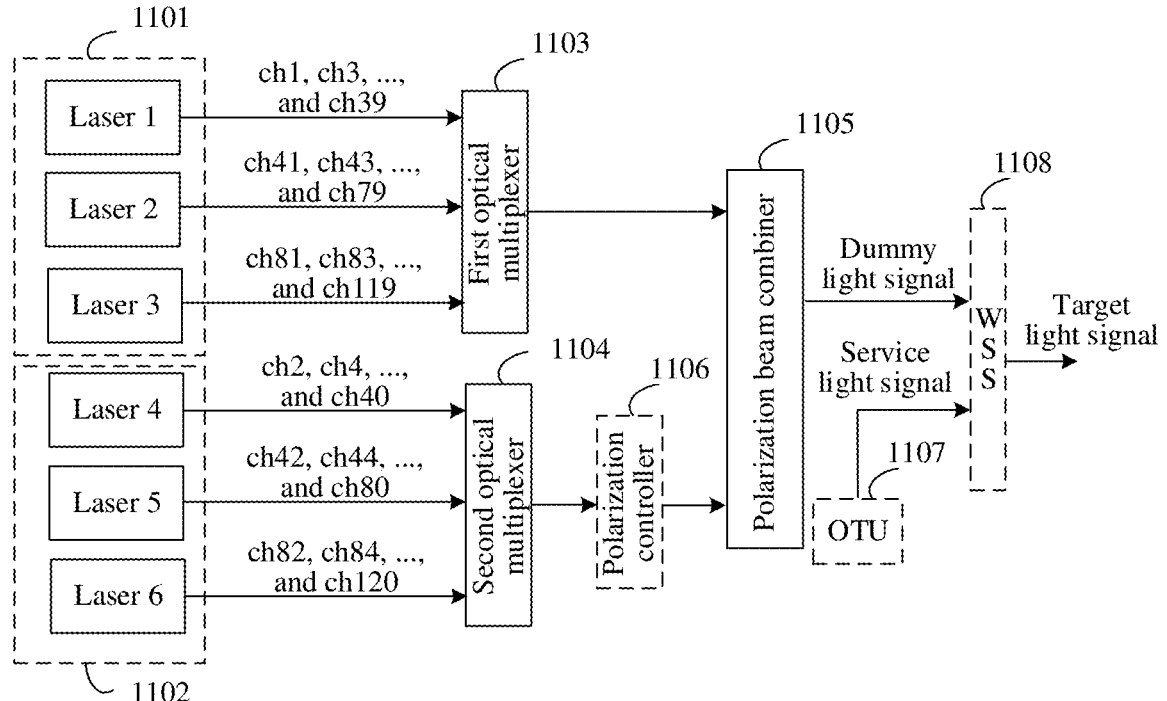
FIG. 11 is another schematic diagram of a structure of a dummy light signal generation apparatus.
FIG. 12 is a schematic diagram of distribution of dummy light signals and service light signals.

The following uses the apparatus shown in FIG. 8 as an example to further extend the solutions provided in the embodiments. FIG. 11 is another schematic diagram of a structure of a dummy light signal generation apparatus according to the embodiments.

The apparatus includes a first light source 1101, a second light source 1102, a first optical multiplexer 1103, and a second optical multiplexer 1104. For descriptions of this part, refer to the foregoing descriptions of the first light source 801, the second light source 802, the first optical multiplexer 803, and the second optical multiplexer 804.

It can be understood from the foregoing descriptions that if the first light source 1101 generates a circularly polarized laser beam (a first wavelength signal), a polarization beam combiner 1105 is equivalent to a polarizer. In this case, the polarization beam combiner 1105 attenuates the first wavelength signal, causing a power waste. In view of this, the first light source 1101 that generates a linearly polarized laser beam may be used. In addition, in comparison with using different light sources, if a same light source is used, subsequent operation and maintenance are simpler. For subsequent operation and maintenance, it is expected that the first light source 1101 and the second light source 1102 are the same, that is, linear polarization directions generated by the first light source 1101 and the second light source 1102 are the same. In this case, if the first wavelength signal and a second wavelength signal are directly input to the polarization beam combiner 1105, the polarization beam combiner 1105 is equivalent to a polarization analyzer. In this case, because linear polarization directions of the first wavelength signal and the second wavelength signal are the same, one of the wavelength signals is attenuated to the greatest extent by the polarization beam combiner 1105, causing a power waste. Therefore, in this embodiment, a polarization controller 1106 is disposed between the second optical multiplexer 1104 and the polarization beam combiner 1105. The polarization controller 1106 is configured to change the linear polarization direction of the second wavelength signal, so that a polarization state of the first wavelength signal is orthogonal to a polarization state of the second wavelength signal, to reduce power attenuation of the first wavelength signal or the second wavelength signal by the polarization beam combiner 1105.

It should be understood that a location of the polarization controller 1106 in FIG. 11 is merely an example. In actual application, the polarization controller 1106 may be alternatively disposed between the second light source 1102 and the second optical multiplexer 1104. For example, the polarization controller includes a polarization controller 1, a polarization controller 2, and a polarization control 3. The polarization controller 1 is configured to change a linear polarization direction of a wavelength signal output by the laser 4. The polarization controller 2 is configured to change a linear polarization direction of a wavelength signal output by the laser 5. The polarization controller 3 is configured to change a linear polarization direction of a wavelength signal output by the laser 6.

The apparatus further includes a WSS 1108 and an optical transform unit (OTU) 1107. The OTU 1107 is configured to transmit a service light signal to the WSS 1108. The WSS 1108 is configured to: receive a dummy light signal and the service light signal, and output a target light signal based on the dummy light signal and the service light signal. The target light signal has N+M channels, and the dummy light signal in the target light signal is used to fill a channel that is in the N+M channels and that transmits no service light signal. FIG. 12 is used as an example. FIG. 12 is a schematic diagram of distribution of dummy light signals and service light signals according to the embodiments. For descriptions of the dummy light signal in FIG. 12, refer to related descriptions corresponding to FIG. 5. In FIG. 12, the service light signal has ch1, ch2, ch3, and ch6. Therefore, the dummy light signal is used to fill ch4, ch5, and ch7 to ch2N that transmit no service light signal and that are of the target light signal; or the service light signal is used to replace a dummy light signal that has a same channel (ch1, ch2, ch3, and ch6) as the service light signal.

In another embodiment, in a channel of the service light signal, a difference between a quantity of first channels and a quantity of second channels is equal to 0 or 1. For example, as shown in FIG. 12, ch1 and ch3 are the first channel, and ch2 and ch6 are the second channel. A difference between the quantity of the first channels and the quantity of the second channels is 0. In this case, in remaining dummy light signals (wavelength signals on ch4, ch5, and ch7 to ch2N), a quantity of first channels is the same as a quantity of second channels, in other words, wavelength signals on the first channel and wavelength signals on the second channel are in a one-to-one correspondence to form polarization state orthogonality. Therefore, nonlinear penalties of the remaining dummy light signals on the service light signal can be reduced as much as possible.

In another embodiment, the target light signal includes a first service light signal, the first service light signal is used to replace a dummy light signal that has a same channel as the first service light signal, and light power of the first service light signal is equal to light power of the dummy light signal having the same channel. For example, as shown in FIG. 12, the first service light signal is a wavelength signal on ch1. Power of the wavelength signal on ch1 is equal to power of a replaced dummy light signal on ch1.

The embodiments further provide a dummy light signal generation method. The method can be based on the dummy light signal generation apparatus described in FIG. 4*a*, FIG. 6, FIG. 8, FIG. 9, FIG. 10, or FIG. 11. A corresponding function is performed by using a module or a component in the apparatus.

Figure 13:
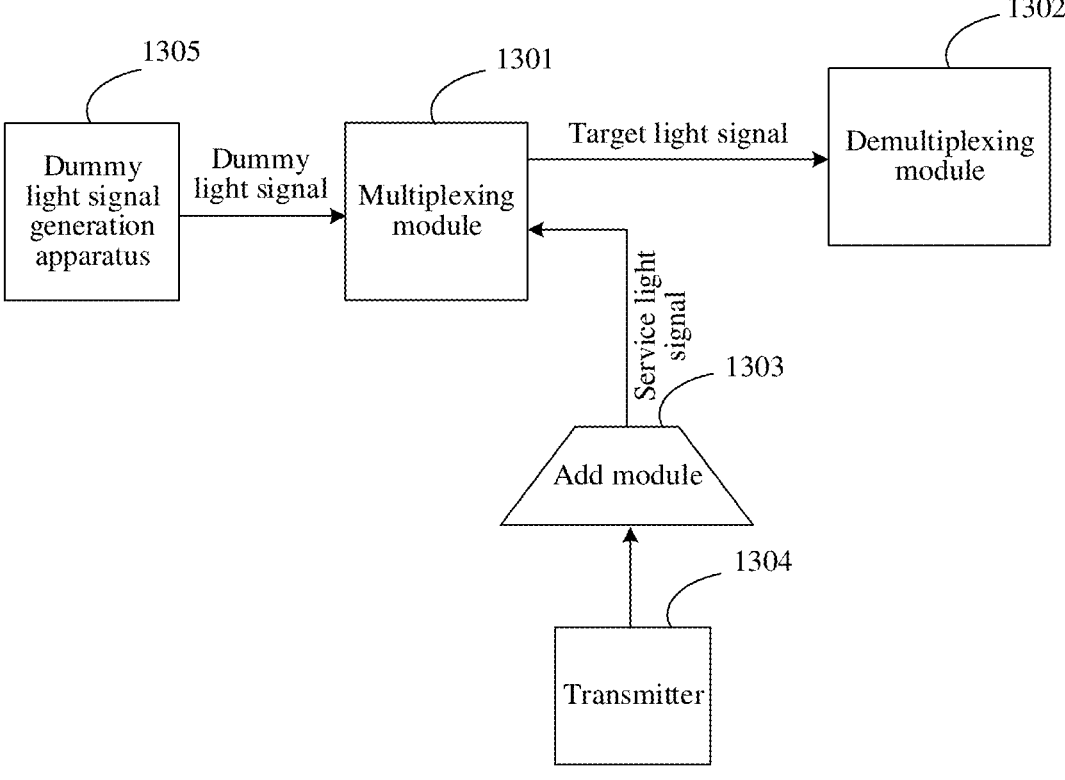
FIG. 13 is a schematic diagram of a structure of an ROADM.

The dummy light signal generation apparatus in the embodiments is described above, and an ROADM is described below. FIG. 13 is a schematic diagram of a structure of an ROADM according to the embodiments.

The ROADM includes: a multiplexing module 1301, a demultiplexing module 1302, an add module 1303, and a dummy light signal generation apparatus 1305 as described in FIG. 4a, FIG. 6, FIG. 8, FIG. 9, FIG. 10, or FIG. 11. The multiplexing module 1301 may be a wavelength selective switch.

The multiplexing module 1301 is configured to: obtain a dummy light signal generated by the dummy light signal generation apparatus 1305; receive a service light signal from the add module 1303; output a target light signal based on the dummy light signal and the service light signal, where the target light signal has N+M channels, and the dummy light signal in the target light signal is used to fill a channel that is in the N+M channels and that transmits no service light signal; and send the target light signal to the demultiplexing module 1302. For example, if the multiplexing module 1301 selects to output the service light signal on a channel having the service light signal, and selects to output the dummy light signal on a channel having no service light signal, the output target light signal may include the service light signal and the dummy light signal. A frequency spectrum range of the service light signal is usually within a frequency spectrum range of the dummy light signal. Further, the frequency spectrum range of the service light signal may alternatively completely overlap the frequency spectrum range of the dummy light signal. For example, the dummy light signal has the M+N channels, and the service light signal has X channels (where a frequency spectrum range of the X channels is within a frequency spectrum range of the M+N channels), and the target light signal includes X service light signals and (M+N–X) dummy light signals. The multiplexing module 1301 may further send the target light signal to the demultiplexing module 1302.

In another embodiment, the ROADM further includes a transmitter 1304. The transmitter 1304 is configured to send the service light signal to the add module 1303, and the add module 1303 is configured to perform power amplification on the service light signal.

The foregoing descriptions are merely implementations of the embodiments and are not intended as limiting. Any variation or replacement readily figured out by a person skilled in the art shall fall within the scope of the embodiments.

What is claimed is:

1. A dummy light signal generation apparatus, comprising:
    a light source module configured to generate a first wavelength signal and a second wavelength signal, wherein the first wavelength signal has N first channels, the second wavelength signal has M second channels, and N and M each are an integer greater than 0;
    a polarization beam combiner configured to polarize and combine the first wavelength signal and the second wavelength signal to output a dummy light signal, wherein the dummy light signal has N+M channels, and the N+M channels comprise the N first channels and the M second channels, among the N+M channels of the dummy light signal, a polarization state of a wavelength signal on any first channel is orthogonal to a polarization state of a wavelength signal on any second channel, a service light signal fills each channel of a first subset of the N+M channels, and the dummy light signal is used to fill each channel in a second subset of the N+M channels that lacks the service light signal; and
    a wavelength selective switch configured to receive both the dummy light signal and the service light signal.

2. The dummy light signal generation apparatus according to claim 1, wherein the light source module comprises a first light source, a second light source, a first optical multiplexer, and a second optical multiplexer, wherein
    the first light source is configured to generate a plurality of first light beams, and the first optical multiplexer is configured to multiplex the plurality of first light beams into the first wavelength signal; and
    the second light source is configured to generate a plurality of second light beams, and the second optical multiplexer is configured to multiplex the plurality of second light beams into the second wavelength signal.

3. The dummy light signal generation apparatus according to claim 1, further comprising:
    a polarization controller configured to adjust polarization states of the plurality of first light beams or the plurality of second light beams generated by the light source module, to enable the polarization states of the plurality of first light beams to be orthogonal to the polarization states of the plurality of second light beams.

4. The dummy light signal generation apparatus according to claim 3, wherein the polarization controller is further configured to adjust a polarization state of the first wavelength signal or the second wavelength signal to enable the polarization state of the first wavelength signal to be orthogonal to the polarization state of the second wavelength signal.

5. The dummy light signal generation apparatus according to claim 1, wherein a wavelength range comprised in the N+M channels is the same as a wavelength range of a C-band.

6. The dummy light signal generation apparatus according to claim 1, wherein N is equal to M.

7. The dummy light signal generation apparatus according to claim 1, wherein the polarization beam combiner is further configured to convert signals between circularly polarized and linearly polarized.

8. A dummy light signal generation method, comprising:
    generating a first wavelength signal and a second wavelength signal using a light source module, wherein the first wavelength signal has N first channels, the second wavelength signal has M second channels, and N and M each are an integer greater than 0;
    polarizing and combining the first wavelength signal and the second wavelength signal by using a polarization beam combiner to output a dummy light signal, wherein the dummy light signal has N+M channels, and the N+M channels comprise the N first channels and the M second channels, wherein among the N+M channels of the dummy light signal, a polarization state of a wavelength signal on any first channel is orthogonal to a polarization state of a wavelength signal on any second channel, a service light signal fills each channel of a first subset of the N+M channels, and the dummy light signal is used to fill each channel in a second subset of the N+M channels that lacks the service light signal; and
    receiving both the dummy light signal and the service light signal by using a wavelength selective switch.

9. The dummy light signal generation method according to claim 8, wherein the light source module comprises a first light source, a second light source, a first optical multiplexer, and a second optical multiplexer, and the method further comprises:

generating a plurality of first light beams by using the first light source;

multiplexing the plurality of first light beams into the first wavelength signal by using the first optical multiplexer;

generating a plurality of second light beams by using the second light source; and multiplexing the plurality of second light beams into the second wavelength signal by using the second optical multiplexer.

10. The dummy light signal generation method according to claim 8, further comprising:

adjusting, by using a polarization controller, polarization states of the plurality of first light beams or the plurality of second light beams generated by the light source module to enable the polarization states of the plurality of first light beams to be orthogonal to the polarization states of the plurality of second light beams.

11. The dummy light signal generation method according to claim 10, wherein a polarization state of the first wavelength signal or the second wavelength signal is adjusted by the polarization controller to enable the polarization state of the first wavelength signal to be orthogonal to the polarization state of the second wavelength signal.

12. The dummy light signal generation method according to claim 8, wherein a wavelength range comprised in the N+M channels is the same as a wavelength range of a C-band.

13. The dummy light signal generation method according to claim 8, wherein N is equal to M.

14. The dummy light signal generation method according to claim 8, further comprising:

outputting a target light signal based on the dummy light signal and the service light signal, wherein the target light signal has the N+M channels.

15. The dummy light signal generation method according to claim 14, wherein the target light signal comprises a first service light signal, the first service light signal is used to replace a dummy light signal that has a same channel as the first service light signal, and light power of the first service light signal is equal to light power of the dummy light signal having the same channel.

16. The dummy light signal generation method according to claim 14, wherein in a channel of the service light signal, a difference between a quantity of the first channels and a quantity of the second channels is equal to 0 or 1.

17. The dummy light signal generation method according to claim 14, wherein the wavelength selective switch is configured to fill the dummy light signal in each channel in the N+M channels that lacks the service light signal.

18. A reconfigurable optical add/drop multiplexer, comprising:

a multiplexing module, an add module, and the dummy light signal generation apparatus according to claim 1, wherein the multiplexing module is configured to:

obtain a dummy light signal generated by the apparatus;

receive the service light signal from the add module;

output a target light signal based on the dummy light signal and the service light signal, wherein the target light signal has N+M channels.

19. The reconfigurable optical add/drop multiplexer according to claim 18, wherein the target light signal comprises a first service light signal, the first service light signal is used to replace a dummy light signal that has a same channel as the first service light signal, and light power of the first service light signal is equal to light power of the dummy light signal having the same channel.

20. The reconfigurable optical add/drop multiplexer according to claim 18, wherein in a channel of the service light signal, a difference between a quantity of first channels and a quantity of second channels is equal to 0 or 1.

* * * * *